United States Patent [19]

Hauser

[11] Patent Number: 4,457,188
[45] Date of Patent: Jul. 3, 1984

[54] SHIFT LEVER MOUNTING ASSEMBLY
[75] Inventor: Hans Hauser, Chippewa Lake, Ohio
[73] Assignee: MTD Products Inc., Cleveland, Ohio
[21] Appl. No.: 309,599
[22] Filed: Oct. 8, 1981
[51] Int. Cl.³ .................... B60K 20/00; F16C 11/06
[52] U.S. Cl. ............................ 74/473 P; 74/473 R; 403/114
[58] Field of Search ............ 403/114, 115, 131, 141, 403/71; 74/473 P, 473 R, 471 XY; 200/6 A; 29/453

[56] References Cited
U.S. PATENT DOCUMENTS

| 2,100,642 | 11/1937 | Geyer | 403/114 |
| 2,227,350 | 12/1940 | Kight | 200/6 A |
| 4,111,570 | 9/1978 | Morel | 403/141 |
| 4,245,137 | 1/1981 | Hirai et al. | 200/6 A |

FOREIGN PATENT DOCUMENTS

| 2460769 | 7/1976 | Fed. Rep. of Germany | 74/473 P |
| 2701947 | 7/1978 | Fed. Rep. of Germany | 74/42 |
| 666304 | 8/1964 | Italy | 200/6 A |
| 2024965 | 1/1980 | United Kingdom | 74/473 R |
| 2037916 | 7/1980 | United Kingdom | 74/473 R |

Primary Examiner—Lawrence J. Staab
Assistant Examiner—Michael J. Gonet
Attorney, Agent, or Firm—Woodling, Krost, Rust and Hochberg

[57] ABSTRACT

This invention discloses a mounting piece for the shift lever (22) on relatively small tractors. A shift ball (21) molded onto the shift lever (22) is inserted into a molded single piece unitary construction bell housing (20) and the bell housing attached to the transmission housing (23).

2 Claims, 6 Drawing Figures

SHIFT LEVER MOUNTING ASSEMBLY

FIELD TO WHICH INVENTION RELATES

My invention relates to a unitary construction mounting piece particularly for mounting a shift lever onto a transmission. It is especially suitable for the shift lever of lawn and garden tractors.

STATEMENT OF THE INVENTION

It is an object of this invention to provide an improved shifting mechanism at an economical cost.

It is an object of this invention to increase the reliability and durability of shift lever mounting assemblies.

It is an object of this invention to increase the safety of shifting mechanisms.

It is an object of this invention to reduce the number of parts required in a shift lever mounting assembly.

It is an object of this invention to simplify the manufacture of a shift lever mounting assembly.

It is an object of this invention to simplify, and speed up, the procedure of mounting a shift lever mounting assembly on a transmission.

Other objects and a fuller understanding of the invention may be had by referring to the following description and drawings in which:

FIGURES OF THE DRAWINGS

DESCRIPTION OF THE INVENTION HEREIN DISCLOSED

Figure 1:
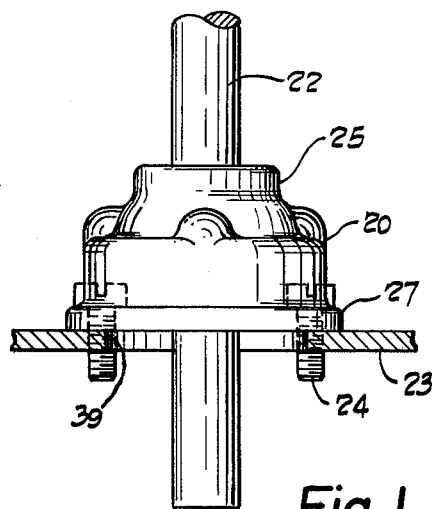
FIG. 1 is a side view of the preferred form of the invention and shows a unitary piece molded bell housing of the shift lever mounting assembly mounted on a transmission housing.
Figure 2:
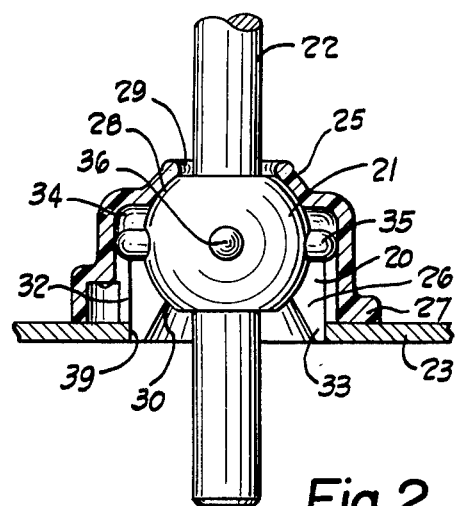
FIG. 2 is a cut-away side view of the assembly of FIG. 1.

The preferred embodiment, FIGS. 1-6, includes a unitary piece bell housing 20, a shift ball 21, a shift lever 22 and a transmission housing 23 (partially shown in FIGS. 1 and 2). Screws 24 hold the bell housing 20 to a wall of the transmission housing 23.

The bell housing 20 has an upper portion 25, a lower portion 26, a mounting flange 27 and a central circular cavity 28. See FIGS. 2, 3, 5 and 6. The upper portion 25 of the bell housing 20 has a central shift lever clearance hole 29 through it. This hole 29 has a cross-sectional area sufficient in size to permit the shift lever 22 to extend therethrough and to wobble angularly relative to the axis of the opening and so limited so as to bar passage of the shift ball 21. The lower portion 26 of the bell housing 20 has a central shift lever clearance hole 30 through it. This hole 30 has a cross-sectional area sufficient in size to permit the shift lever to extend therethrough and to wobble angularly relative to the axis of the opening and so limited so as to bar passage of the shift ball 21 when the lower portion 26 is in its normal position. The lower portion 26 of the bell housing 20 has small cutaways or slits 31 in it. These slits create four resilient prongs out of the lower portion 26 of the bell housing. These prongs allow for the effective resilient expansion of the material surrounding the clearance hole 30. These prongs permit the material to flex and spring back to its original position. The hole 30 can expand in cross-sectional area sufficient to allow for the molding core to be withdrawn during the molding operation and to allow the shift ball 21 to pass through the opening 30. Once the shift ball 21 is inserted into the central cavity, the prongs grip the shift ball 21 snugly to eliminate looseness. An annular slot 32 around the lower portion 26 of the bell housing 20 between the lower portion 26 and the mounting flange 27 eases the expansion of the material during the molding and assembly operation. Due to the annular slot 32, the cutaways or slits 31 do not have to extend through to the exterior of the bell housing 20. The structural strength of the bell housing 20 is not compromised by the slits 31.

Figure 3:
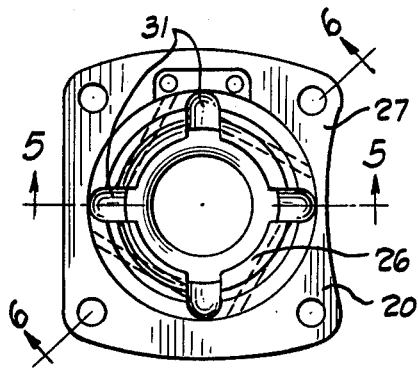
FIG. 3 is a bottom view of the bell housing of FIG. 1 unmounted from a transmission housing.
Figure 4:
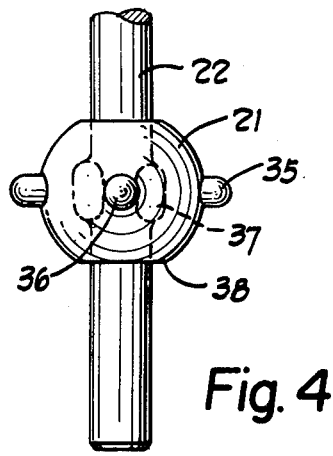
FIG. 4 is a side view of the shift ball and the lower portion of a shift lever, this view showing in dotted lines the tabs or ears for retaining the ball on the lever.
Figure 5:
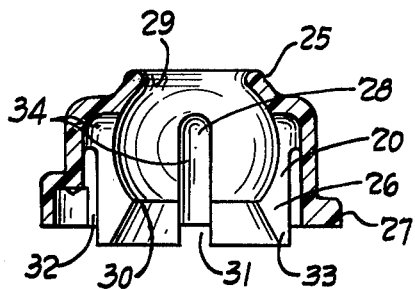
FIG. 5 is a cut-away side view of the bell housing of the assembly of FIG. 1, taken generally along lines 5—5 in FIG. 3.
Figure 6:
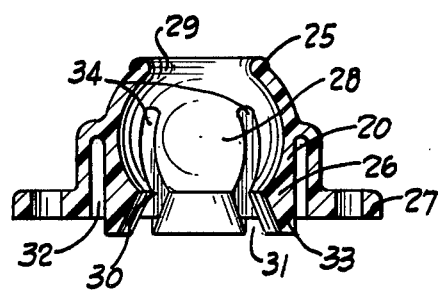
FIG. 6 is a cut-away side view of the bell housing of the assembly of FIG. 1 taken generally along lines 6—6 in FIG. 3.

In an alternate embodiment, a series of individual diagonal slits as seen in dotted line in FIG. 3 could replace slits 31 in creating the resilient prongs. If diagonal slits were used, slot 32 would not be necessary.

Part 33 of the lower portion 26 of the bell housing 20 extends somewhat downwardly beyond the plane of the bottom of the mounting flange 27.

Four equidistantly spaced guide slots 34 extend upwardly from the bottom of the housing through the lower portion 26 and into the upper portion 25 of the bell housing 20. See FIGS. 5 and 6. These slots 34 terminate in the flared cutaways portions 31 that facilitate the effective expansion of the lower portion 26 of the bell housing 20.

The bell housing 20 is of a partially flexible plastic moldable substance such as Zytel St 801 or glass filled nylon 6/6 having the required properties of yieldable resiliency for the purposes of assembling the parts as herein described. Any material that can flex from and spring back to its original position can be used.

The shift ball 21 is fixedly attached to the shift lever 22 by molding the ball on the lever 22 about the ears 37. See FIGS. 2 and 4. Pairs 35 and 36 of small equidistantly spaced pins integrally formed on the ball protrude radially outwardly from the shift ball 21 on a central plane generally normal to the axis of the shift lever 22. These four pins are accommodated in guide slits 34. Small tabs or ears 37 on the shift lever 22 lock the shift lever 22 to the shift ball 21. These pins and tabs prevent rotation of the shift lever in respect to the transmission. They allow the shift lever to be shaped as desired, including with considerable bends and lengths off center, with manipulation of the shift lever working to actuate the transmission instead of being lost in inherently produced rotational movement. The shift ball 21 preferably has flat ends 38.

The outer diameter of the shift ball 21 is very slightly more than the inner diameter of the central cavity 28 of the bell housing 20 to be snugly engaged therein. The outer diameter of the shift ball 21 is considerably more than the diameter of the hole 29 at the upper portion 25 of the bell housing 20 to retain the ball in the bell housing after assembly. The outer diameter of the shift ball 21 is considerably more than the diameter of the unexpanded clearance hole 30 through the lower portion 25 of the bell housing 20 to facilitate wobbling of the lever 22 while retaining the ball within the housing after assembly of the parts.

The shift ball 21 and integral pins 35 and 36 are of a tough substance such as molded nylon plastic with 25% glass fiber reinforcement.

The shift ball 21 is inserted through hole 30 to be positioned within the central cavity 28 of the bell housing 20. Due to the flexing and spring back properties of the material of the prongs, the prongs flex to allow the expansion of the effective diameter of hole 30 and the passage of the shift ball 21 through hole 30. The prongs then spring back substantially to their original and normal position. The hole 30 returns substantially to its original unexpanded diameter. The pairs 35, 36 of the small pins of the shift ball 21 are within the four slots 34, respectively, of the bell housing. The prongs grip the shift ball 21 snugly. The shift ball 21 is trapped and confined within the central cavity 28.

Once inserted only a considerable physical effort will remove the shift ball 21 from the central cavity 28 of the bell housing 20. Since such physical effort usually needs conscious effort, the shift lever sub-assembly need not have much care to avoid disassembly prior to its attachment to a transmission.

The wall of transmission housing 23 has a bore 39 over which the shift lever mounting assembly is mounted. The bore 39 has a diameter equal to or slightly greater than the diameter of the part 33 of the lower portion 26 of the bell housing 20 that extends down beyond the plane of the bottom of mounting flange 27.

The bell housing 20, shift ball 21 and the shift lever 22 assembly is mounted on the wall of transmission housing 23 with part 33 of the lower portion 26 of the bell housing 20 aligned with and extending into the bore 39 in the transmission housing 23. The peripheral edge portion of the bore 39, being of non-yieldable material, prevents any but nominal movement of the prongs and thus any expansion of the effective diameter of the clearance hole 30 in the lower portion 26 of the bell housing 20 after the insertion of part 33 into the bore 39. After attachment the shift ball 21 being confined and trapped cannot be removed from the central cavity 28 of the bell housing 20.

Four self-threading screws 24 through the mounting flange 27 of the bell housing 20 secure the shift lever mounting assembly to the transmission housing 23.

Because the shift ball 21 is gripped tightly by the bell housing 20 the shift lever is prevented from being moved by the bouncing or vibration inherent in moving vehicles. The shift lever will not inadvertently engage or disengage the transmission gears.

The shifting mechanism has a precision feel to it due to the fact that the shift ball 21 is so closely confined within the bell housing 20. Inasmuch as the shifting mechanism is an important feature that the consumer comes in close contact with in the operation of a transmission, this precise and close fitting characteristic imparts a quality image to the transmission in general.

The improved shift lever assembly has the efficient and economical advantage of being comprised of relatively few parts. The bell housing 20, shift ball 21 and shift lever 22 can be manufactured and assembled into a shift lever mounting assembly separately of the transmission without fear of missing parts.

Once attached to the transmission housing 23, and the part 33 of the lower portion 26 of the bell housing 20 thereby confined from expanding, the shift lever assembly will not come apart for any less a reason than the total collapse or breakage of a part of the assembly.

Although this invention has been described in its preferred form in a certain degree of particularity, it is to be understood that numerous changes could be made without departing from the invention as hereinafter claimed.

What is claimed is:

1. A mounting housing for accommodating the shift ball mounted on a shift lever, said mounting housing having an upper portion and a lower portion, said mounting housing having a cavity to accommodate said shift ball, each of said portions having an opening extending therethrough into said cavity, said opening of said upper portion having a cross-sectional area sufficient in size to permit the shift lever to extend therethrough and to wobble angularly relative to the axis of said opening and so limited in cross-sectional area as to bar passage of the shift ball upwardly through said opening, said opening of said lower portion having a cross-sectional area sufficient in size to permit the shift lever to extend therethrough and to wobble angularly relative to the axis of said opening and so limited as to bar passage of said shift ball therethrough in the normal position of said lower portion around said opening, said shift ball having pins extending radially outward therefrom, said mounting housing having guiding grooves extending outwardly therein from said cavity to accommodate said pins, respectively, and to permit movement of said pins in said grooves upon rotation of the shift ball by wobbling the shift stick to tilt the same, said grooves extending longitudinally through said lower portion to said upper portion for permitting the pins to be moved upwardly into said grooves, said grooves opening into said cavity accommodating said shift ball, said lower portion of said mounting housing being of resiliently yieldable material having an annular slot disposed around, and spaced radially outward of, said opening in said lower portion to permit the material around said opening of said lower portion to flex into said annular slot and spring back from said normal position sufficiently to permit the shift ball to enter through said opening in said lower portion into said cavity to be held therein upon the said material around said opening in said lower portion resuming its normal position, said mounting housing being attached over a hole in a transmission housing with the lower end of the shift lever extending through the hole and the peripheral edge portion of the hole through the transmission housing engaging the confining said lower portion to prevent significant flexing of the material around said opening of said lower portion and thus keeping the material around said opening in said lower portion at the normal position, the arrangement capturing the shift ball in said cavity.

2. A mounting housing for accommodating the shift ball mounted on a shift lever, said mounting housing being a unitary piece having an upper portion and a lower portion, said upper and lower portions of said mounting housing defining a cavity to accommodate the shift ball, each of said portions having an opening extending therethrough into said cavity, said opening in said upper portion having a cross-sectional area sufficient in size to permit the upper part of a shift lever to extend therethrough and to wobble angularly relative to the axis of said opening and so limited in cross-sectional area as to bar passage of the shift ball upwardly through said opening, said opening of said lower portion having a cross-sectional area sufficient in size to permit the lower part of a shift lever to extend therethrough and to wobble angularly relative to the axis of said opening and so limited as to bar passage of said shift ball therethrough in the normal position of the material around said opening, said shift ball having pins extending radially outward therefrom in a common plane, said mounting housing having guiding grooves extending outwardly therein from said cavity to accommodate said pins, respectively, said grooves extending longitudinally through said lower portion to said upper portion for permitting the pins to be moved upwardly into said grooves, said grooves opening into said cavity accommodating said shift ball, and to permit movement of said pins in said grooves upon rotation of the shift ball by wobbling the shift stick to tilt the same, said lower portion of said mounting housing being of resiliently yieldable material and being circumferentially slotted around said opening in said lower portion at a radially spaced distance from said opening to permit the material of said lower portion around said opening of said lower portion to flex into the said circumferential slot and spring back from said normal position sufficiently to permit the shift ball to enter upwardly through said lower opening into said cavity to be held therein upon the material of said lower portion around said opening in said lower portion resuming its normal position, said mounting housing being positioned over and into a hole in a transmission housing with part of said lower portion of said mounting housing extending thereinto, the peripheral edge of the hole in the transmission housing engaging and confining the material of said lower portion around said opening in said lower portion to prevent it from flexing outwardly from said normal position sufficiently to permit the shift ball to pass through said opening in said lower portion from said cavity, thus capturing the shift ball in said cavity so long as part of said lower portion of said mounting housing extends into the hold in the transmission housing.

* * * * *